2,699,408

MAGNETIC RECORD MEMBER

Marvin Camras, Chicago, Ill., assignor to Armour Research Foundation of Illinois Institute of Technology, Chicago, Ill., a corporation of Illinois No Drawing. Application March 24, 1950, Serial No. 151,813

5 Claims. (Cl. 117—81)

The present invention relates to a novel type of magnetic record member, and to coating compositions which are useful in manufacturing such a magnetic record member.

The present application is a continuation-in-part of my United States application, Serial No. 667,497, filed May 4, 1946, and now abandoned, entitled "Magnet Material and Magnetic Recording Medium and Method of Making the Same."

Magnetic record media such as tape, discs and the like now in common use have several inherent disadvantages. These record members usually consist of a paper stock having a lacquer coating in which the magnetic particles are dispersed. The lacquers are water insoluble so that the coating must be made through the use of special coating procedures involving expensive solvents and fire hazards. Even more important, however, is the fact that lacquer-type coatings are inherently incapable of holding large amounts of powdered magnetic material. For example, in record media having coatings of nitrocellulose lacquers, the weight ratio of magnetic particles to lacquer does not exceed 2.5. If amounts of magnetic material are used in excess of that ratio, it is found that upon drying of the lacquer, the excess material will flake or rub off and be useless for recording purposes. This inability to maintain sufficient amounts of magnetic particles in suspension makes the lacquer-type record member objectionable because the output from such a record member is at a low level and so the signal-to-noise ratio is low.

Another very important consideration making the use of lacquer-type record members objectionable is their high cost. Not only are the cellulose derivatives used in such lacquers expensive, but the solvents and plasticizers required to make a suitable coating composition also raise the cost of the magnetic records to a point where the ordinary home user of magnetic recording apparatus is limited in the number of extra spools of magnetic tape which he finds economical to keep on hand.

The present invention is concerned with the provision of an entirely different type of magnetic record member characterized by its ease of manufacture and low cost. These advantages are attained by the novel record member of the present invention while still providing a record member having a substantially greater weight of magnetic particles per linear unit of the record member than the previously used lacquer-type members.

One of the features which characterizes the present invention is the provision of a magnetic layer on a base, the layer consisting of relatively large amounts of magnetic particles, such as iron oxides, in combination with a water-soluble binding agent.

An object of the present invention is to provide a novel type of magnetic record member which is easy to manufacture and considerably less expensive than the lacquer-type magnetic record members now in common use.

Still another object of the present invention is to provide novel coating compositions suitable for the manufacture of the record members above described.

Yet another object of the present invention is to provide a water-soluble binder for coating magnetic record tapes and the like, having uniformly dispersed therein proportionately larger amounts of magnetic particles than were previously possible to incorporate in record members.

Another object of the present invention is to provide an extremely thin, flexible record member which is capable of conforming completely to the reproducing head of an electromagnetic recording system without excessive tension and without having the magnetic layer on the magnetic record member crack or become otherwise distorted.

Another object of the present invention is to provide a record member having a higher level of output than the record members now in common use, thus decreasing the amount of amplification required in the reproducing system.

Other objects and features of the present invention will be apparent to those skilled in the art from the following description and the appended claims.

The concept of the present invention can be applied to a large number of magnetic record members. While the most important of these applications will be in connection with the coating of thin paper tape, it will be recognized that the invention is also applicable to coated discs, belts, and the like. Nor is the invention restricted to the coating of paper inasmuch as it has been successfully practiced with other base materials such as, for example, cellulose acetate, aluminum, and glass.

In general, the record member of the present invention consists of a thin base, such as paper, over which there is a primary coating which is preferably of a water-resistant material. The only required attribute for this undercoating is that it presents a very smooth exterior surface to which the overlying magnetic layer can adhere. A smooth surface has been found to decrease substantially the recorded noise level.

In one phase of the invention, it has been found possible to produce a base mixture which may be used for the undercoating and also as the water-soluble binder into which the magnetic particles are incorporated. In accordance with this invention, means are provided for softening the magnetic layer so that the resulting record medium is extremely flexible and may be wrapped around the recording and reproducing head in conformance with the contour of the head without flaking or chipping the magnetic layer, and with a minimum of tension.

As another feature of the invention, the magnetic layer is provided with an outer coating of wax, to impart a smooth surface over the magnetic particles, and thus reduce the abrasion on the reproducing heads as the record medium is being drawn therethrough.

The binders used in connection with the present invention may be characterized as water-soluble or dispersible organic adhesives of which casein is probably the most important example. However, other protein materials either of vegetable or animal origin, such as gelatin, or starches such as soya bean flour and the like, may be employed. I have found that such water-soluble organic adhesives have the ability to carry large amounts of magnetic particles in suspension and, when dry, hold these particles in dispersion in the magnetic layer without evidence of flaking or peeling.

The primary coating of the record member, which, in this instance, is preferably a strong paper tape of between .001 to .002 inch in thickness, may be a relatively thin coat of a lacquer, such as cellulose nitrate or cellulose acetate lacquer, or a resin lacquer such as an alkyd resin. In addition to the previously mentioned materials, which are water-insoluble, a water-soluble undercoating may be employed. As mentioned previously, this water-soluble coating may contain the same type of organic adhesive used in the magnetic coating layer.

It is also within the scope of this invention to apply the magnetic layer onto the base without a primary coating, provided the base is supercalendered or otherwise treated to prevent a very smooth outer surface. In general, however, the provision of an undercoating of the type described is to be preferred.

A base mixture may be prepared for use in the undercoating as well as in the magnetic coating by preparing the following:

*Table I*

| | Parts by weight |
|---|---|
| Casein | 1 |
| Water | 1–15 |
| Ammonium hydroxide solution (conc.) | .1–1 |
| Anti-foam agent | As required |

The ammonium hydroxide is employed to facilitate the solution of casein in water. Other alkaline agents may be employed in addition to or instead of the ammonium hydroxide, for example, sodium carbonate, sodium hydroxide, borax, trisodium phosphate, calcium hydroxide and the like.

The amount of casein to be used depends on the coating procedure to be employed, but a solution containing 15% casein has been found effective for general usage.

The anti-foam agent is employed to decrease the amount of foam normally generated when such solutions are agitated. A typical foam inhibitor for use in this connection is a pine oil composition, although others will suggest themselves to those skilled in the art.

While the examples given herein all relate to casein adhesives, it will be recognized that the same procedure will be applicable for other water-soluble adhesives such as gelatin or starches.

A typical composition prepared for use as a base mixture in the coatings of the present invention has the following composition:

*Table II*

| | Parts by weight |
|---|---|
| Casein | 11.2 |
| Water | 58.8 |
| Ammonium hydroxide (conc.) | 5 |
| Pine oil | As required |

The ingredients were heated together to a temperature of about 150° C. under constant agitation. When the ingredients were completely dissolved, they were strained through a fine mesh screen and allowed to cool.

Two parts by weight of the base mixture were then diluted with one part by weight of water, together with a small amount of foam inhibitor, and then applied to the paper stock. The coating may be accomplished by means of a brush, a series of applicator rolls, or by means of a blade coater, and then allowed to dry. The mixture is kept warm during the application, with temperatures up to 140° F. being appropriate. While only one side of the paper stock need be coated, a better product is obtained by coating both sides.

Better results are obtained if the undercoating above described is rendered water-resistant so as to reduce the tendency of subsequent coatings to dissolve or penetrate the undercoat. The undercoat may be rendered water-resistant by treating the same with suitable solution. For example, one such treating solution consists of 0.5 part by weight alum and 24.5 parts by weight of water, using the same weight units as in the base mixture. Another suitable treating composition consists of 0.5 part by weight of a 40% formaldehyde solution and 17.5 parts by weight water.

Either of these solutions may be run over the undercoated paper, after which the paper is dried and preferably calendered to improve the smoothness and uniformity of the surface. If desired, these insolubilizing compositions may be mixed with the undercoating composition before it is applied to the paper stock.

After the undercoating has been applied and allowed to dry, it is coated with a magnetic coating containing a water-soluble adhesive. Satisfactory magnetic coating mixtures have been obtained by the use of the following ingredients:

*Table III*

| | Parts by weight |
|---|---|
| Base mixture | 1 |
| Magnetic powder | .5–5 |
| Water (to give coating consistency), approx | .5–5 |

While the magnetic powder used in accordance with the present invention does not form an essential feature thereof, it will be appreciated that the quality of the magnetic record medium will be primarily dependent upon the magnetic characteristics of the powder employed. In previous applications, I have described methods for producing magnetic iron oxide particles characterized by their extremely small size, being on the order of 6 microns more or less, and preferably 1 micron or less in maximum dimension, and having coercive force values of 200 or greater. It is this type of magnetic powder which will produce the highest quality record members, but it will be appreciated that other types of magnetic powder may be employed if desired.

As a specific example of the magnetic coating mixture which was employed with the specific undercoating of Table II, the following is given:

*Table IV*

| | Parts by weight |
|---|---|
| Base mixture | 12.7 |
| Magnetic powder | 9 |
| Water | 10 |

It will be seen that in this coating composition, there are approximately five parts of magnetic powder for each part by weight of casein. A large percentage of magnetic powder is one of the characterizing features of the present invention, as previously described. In any event, the amount of magnetic powder should be about three times that of casein or other binder present in the magnetic coating mixture, and a ratio of five parts magnetic powder to one part casein seems to give the best results. However, as many as ten parts of magnetic particles per part of casein have been successfully employed in making the magnetic record member, although these coating compositions are somewhat more difficult to handle.

The ingredients of the magnetic coating mixture are mixed by milling together in a pebble mill or equivalent mixing device. After mixing to a homogeneous consistency, the coating is applied to the paper in the same manner as the undercoating, and is regulated to make the thickness of the final magnetic layer in the range from about .0001 to .001 inch. A magnetic layer of .0005 inch is a very desirable norm. It is important that there be no abrupt changes in the thickness of the magnetic coating along the length of the record member. Since the magnetic particle dispersion as prepared above is extremely homogeneous, the required uniformity in the thickness of the magnetic coating may be attained quite readily.

The magnetic coating after application may be waterproofed as described in connection with the undercoating by treating with a solution of alum or formaldehyde. However, while this procedure is desirable, it is not essential and for reasons of economy, it may be omitted. After the member has been coated with the magnetic coating composition, it is dried, the paper is calendered and then cut into form suitable for magnetic recorders.

Many modifications may be made in the coating mixture above described to attain various purposes. For example, a wax composition can be incorporated into the coating mixture itself to give a smoother surface to the magnetic layer and thus avoid abrading the magnetic heads over which the record member passes. The following composition has been found suitable for incorporation with the coating mixture described in Table IV:

*Table V*

| | Parts by weight |
|---|---|
| Beeswax | 1 |
| Brown borax soap | 0.15 |
| Water | 8.3 |

The composition described in Table V is prepared by mixing the ingredients while heating the composition to about the boiling temperature and then adding the emulsion which results from such mixing to the coating mixture. If the resulting mixture is too thin some of the water may be omitted when preparing the original coating composition. It has been found that the incorporation of wax in this manner allows better smoothing out of the coating during calendering, and that a smoother, more uniform surface results. This surface is not so abrasive as ordinary surfaces on magnetic record members and greatly increases the life of the magnetic transducer head. It will be appreciated that equivalent ingredients may be employed for specific components described in connection with the wax emulsion of Table V. For example, the beeswax may be replaced by paraffin, synthetic waxes such as carbowax or the microcrystalline waxes recoverable from petroleum refining.

The brown borax soap of the example is employed as an emulsifying agent, although other surface-active agents, including ordinary soaps, which are normally used for emulsifying wax compositions may similarly be employed.

One of the most serious defects in connection with magnetic record media is their failure to make continuous close contact with transducer heads during the recording or play-back processes. While the use of a thinner base material helps somewhat, even the thinnest practical paper stocks do not overcome this difficulty completely. I have found that this problem can be very effectively solved by incorporating a softening agent into the magnetic coating composition or into the undercoating. The agent should be one which does not dry out, but remains soft, rendering the finished record member more flexible, and capable of better conformity with the arcuate surfaces of magnetic heads. The most convenient as well as the most economical material which can be used as a softening agent is glycerol in solution in water. Solutions containing from 5 to 25% glycerol can be substituted for the water used in making up the magnetic coating composition. Thus, for example, if the water content of the coating composition of Table IV is substituted by a 10% solution of glycerol in water, the following mixture results:

*Table VI*

| | Parts by weight |
|---|---|
| Base mixture | 12.7 |
| Magnetic powder | 9 |
| Glycerol | 1 |
| Water | 9 |

In this embodiment, it is also desirable to substitute a 5–25% glycerol solution for the water used in making up the base mixture.

In line with the above, an extremely flexible magnetic record member can be made by coating a paper base stock having a thickness of from 0.0005 inch to 0.0015 inch with the undercoating as previously described and then coating the material with the coating composition described in Table VI to a thickness of about .0005 inch.

In addition to glycerol, suitable softening agents include other water-soluble polyhydricalcohols, such as ethylene glycol monoethyl ether, and other derivatives of ethylene glycol. The important consideration is that the softening agent be compatible with the rest of the water-soluble mixtures and that for maximum flexibility, the paper stock should not exceed a thickness of about .0015 inch.

Instead of incorporating wax into the coating mixture, or in addition to such incorporation, a final polishing operation has been found to give a smooth surface for magnetic recording purposes which reduces head wear and improves uniformity. This polishing may be accomplished by burnishing a moving tape, coated as previously described, with a revolving brush. Coating mixtures having a high percentage of magnetic powder will acquire an exceptionally smooth, bright finish by this operation.

The burnishing operation can be combined with a wax coating process by having the polishing brushes pick up a film of wax from a suitable source or by coating the tape by means of a revolving waxing brush or roll prior to contacting the moving tape with the polishing brushes.

Natural waxes such as beeswax, paraffin, and carnauba wax, as well as synthetic waxes, can be used to good advantage for this overcoating. In addition, other hydrophobic agents such as stearic acid may be used. These wax-like compositions may be mixed with an alkaline emulsifying agent such as borax, soap, lye, ammonia, or sodium carbonate in a proportion of about 10% to 20% of emulsifying agent to the amount of wax or other overcoating material used.

The anti-abrasion outer wax coating should be from 0.00005 to 0.0002 inch in thickness.

Several modifications in the structure of the magnetic impulse record member of the present invention will be presently discussed.

One important modification of the invention consists in incorporating in the undercoat, magnetic powder of a lower coercive force than that employed in the magnetic coating. It has been found that the magnetic particles incorporated into the undercoat having a coercive force value of about one-half of the coercive force value of the magnetic particles used in the magnetic layer gives satisfactory results. This underlying layer of relatively low coercive force improves the low frequency response of the member, while at the same time providing a smooth base for deposition of the magnetic coating.

The undercoating may also be modified by including fillers such as barytes, clay, lamp black, titanium dioxide, or lithopone. Such fillers and pigments not only provide a smooth undercoat surface but also decrease the cost of the product.

It will also be appreciated that in practicing the invention, suitable surface-active agents may be incorporated into any of the coating mixtures to decrease the surface tension and to improve the dispersion of any solid material carried therein and the flow of the resulting dispersion.

It will be appreciated that various modifications may be made without departing from the scope of the novel concepts of the present invention.

I claim as my invention:

1. A magnetic impluse record member comprising a thin paper base, a water-resistant casein coating, said coating having a smooth outer surface, a magnetic coating on said smooth surface comprising casein and magnetic particles in the ratio of at least three parts by weight of magnetic particles to one part casein, and a wax coating over said magnetic coating.

2. A magnetic impulse record member comprising a paper base of 0.001 to 0.002 inch in thickness, a casein primary coating bonded to said base and having a smooth calendered surface, a magnetic coating of 0.0001 to 0.001 inch in thickness bonded directly to said calendered surface, said magnetic coating comprising a mixture of at least 3 parts of magnetic powder to 1 part of casein as binder, and a superficial coating of wax of not over 0.0002 inch in thickness over said magnetic coating.

3. A magnetic impulse record member comprising a paper base of 0.001 to 0.002 inch in thickness, a casein primary coating bonded to said base and having a smooth calendered surface, a magnetic-binder coating of 0.005 inch and less thickness bonded directly to said calendered surface, and a superficial coating of wax of not over 0.0002 inch in thickness over said magnetic-binder coating, said magnetic-binder coating consisting essentially of a water soluble binder and magnetic particles having a coercivity of 200 oersteds and over, the magnetic particles being present in the weight ratio of at least 3 parts of magnetic particles to 1 part of binder.

4. A magnetic record member for use in an electromagnetic recording system in which the member passes in contact with magnetic heads, a very thin, flexible base strip of non-magnetic material having an extremely smooth surface, a magnetic coating of 0.0001 to 0.001 inch in thickness bonded to said surface consisting essentially of at least 3 parts of magnetic particles to 1 part by weight of an organic binder, said particles being of less than 6 microns maximum dimension and having a coercive force value of at least 200 oersteds, and a coating of a sufficient amount but not over 0.0002 inch in thickness of waxy material adhering to said magnetic coating to impart a smooth surface over said magnetic particles to thereby reduce the abrasive action of said magnetic particles upon said heads.

5. The magnetic record member of claim 4 in which the waxy material is also a component part of said magnetic coating and provides a superficial outer waxy coating of 0.00005 to 0.0002 inch in thickness.

References Cited in the file of this patent

UNITED STATES PATENTS

| | | |
|---|---|---|
| 1,181,889 | Hommel | May 2, 1916 |
| 1,820,867 | Crowder | Aug. 25, 1931 |
| 1,826,711 | Andrews | Oct. 13, 1931 |
| 1,949,840 | Languepin | Mar. 6, 1934 |
| 2,101,574 | Dangelmajer | Dec. 7, 1937 |
| 2,108,582 | Dunham | Feb. 15, 1938 |
| 2,112,728 | Morgenstern et al. | Mar. 29, 1938 |
| 2,146,281 | Anderson | Feb. 7, 1939 |
| 2,418,479 | Pratt et al. | Apr. 8, 1947 |
| 2,524,433 | Downs et al. | Oct. 3, 1950 |
| 2,525,601 | Howell | Oct. 10, 1950 |
| 2,547,948 | Kornei | Apr. 10, 1951 |

FOREIGN PATENTS

| | | |
|---|---|---|
| 324,099 | Great Britain | Jan. 17, 1930 |
| 340,705 | Great Britain | Jan. 8, 1931 |
| 355,669 | Great Britain | Aug. 24, 1931 |
| 466,023 | Great Britain | May 18, 1937 |
| 468,068 | Great Britain | June 28, 1937 |